United States Patent Office 2,745,864
Patented May 15, 1956

2,745,864
METHOD OF PREPARING UNSATURATED NITRILES

James K. Dixon, Riverside, Conn., assignor to American Cyanamid Company, New York, N. Y., a corporation of Maine No Drawing. Application February 18, 1953,
Serial No. 337,689

8 Claims. (Cl. 260—464)

The present invention relates to the production of nitriles. More particularly the invention relates to the production of unsaturated nitriles by interaction of olefins with a cyanogen halide.

Heretofore, the synthesis of unsaturated nitriles has been possible by reactions promoted by various types of catalysts. However, methods of synthesis involving such reactions may have well-defined limitations imposed by the availability and cost of the catalytic material, and the attention required to maintain the catalyst in a satisfactory active state.

The principal object of the present invention is to provide a simple and direct method for the preparation of unsaturated nitriles. Another important object is to manufacture unsaturated nitriles from inexpensive raw materials. These and other objects which will be hereinafter disclosed are provided by the following invention wherein unsaturated nitriles are readily obtained by reaction of olefins with cyanogen chloride in the vapor phase at a temperature of at least about 450° C.

In accordance with the present invention the reaction is effected by passing controlled proportions of the olefin and cyanogen chloride through a hot reaction tube maintained at a temperature within the range of from about 450° to 750° C., and more preferably at an average temperature within the range of from 500° to 675° C.

The reactants are passed through the hot reaction tube at a velocity sufficiently slow to permit reaction, but not so slowly that the olefin has an opportunity to decompose. A residence time of from 3 to 12 seconds is usually suitable.

Although the reaction may be successfully effected with equimolecular proportions of reactants, it is preferred to operate with a molar excess of the olefin and usually in a ratio of olefin to cyanogen chloride of 2:1 or higher.

The reaction is preferably conducted at atmospheric pressure, but subatmospheric and superatmospheric pressures may be employed if desired.

The invention is further illustrated, but not limited, by the following examples:

Example 1

Propylene (3.2 moles) and cyanogen chloride (1.4 moles) were passed through a Pyrex reactor tube maintained at a temperature of 660° C. The contact time of the gases in the reaction zone was about 6 seconds. The gases from the reactor were passed through a receiver flask maintained at a temperature of 40° C. in which most of the crude nitrile product was collected. The gases which did not collect in the receiver flask were passed through a condenser maintained at about 10° C. and thence through a train consisting of an ice trap (0° C.), two Dry-Ice traps (−78° C.), and an alkali bubbler containing approximately 2 N sodium hydroxide. A small amount of the product was collected in the ice trap. The material collected in the Dry-Ice traps was principally unreacted propylene and cyanogen chloride, and a small amount of product. The hydrogen chloride which was formed in the reaction was collected in the alkali bubbler. The crude product which was collected in the receiver flask, ice trap and Dry-Ice traps was combined and distilled. Three fractions were collected. Fraction 1, boiling between 75° and 100° C., was principally acetonitrile and acrylonitrile. Fraction 2, boiling between 100° and 130° C., consisted of a mixture of cis- and trans-crotononitrile and allyl cyanide. Fraction 3, boiling between 130° and 190° C., consisted of a mixture of crotononitrile and benzonitrile. The amount of each nitrile obtained was determined from the weight of each fraction and an infra-red analysis of its composition. Calculated on the initial input of cyanogen chloride, the percent yields of the nitriles were as follows: allyl cyanide 22%, cis-crotononitrile 10%, trans-crotononitrile 9%, acrylonitrile 6%, acetonitrile 5%, and benzonitrile 3%.

Example 2

Using apparatus and procedure analogous to that of Example 1, propylene (2.5 moles) and cyanogen chloride (1.37 moles) were passed through the reactor tube at an average temperature of 660° C. The contact time of the gases in the reaction zone was about 10 seconds. The percent yields of the nitriles were as follows: allyl cyanide 12%, cis-crotononitrile 14%, trans-crotononitrile 13%, acrylonitrile 3%, acetonitrile 3%, and benzonitrile 3%.

Example 3

Using apparatus and procedure analogous to that of Example 1, 3.74 moles of propylene and 1.85 moles of cyanogen chloride were passed through the reactor tube at a temperature of 600° C. for a contact time of 8 seconds. The percent yields of the nitriles were as follows: allyl cyanide 11%, cis-crotononitrile 5%, and trans-crotononitrile 1%.

Example 4

Using the same apparatus and procedure of the preceding examples, 1-butene (4.28 moles) and cyanogen chloride (1.88 moles) were passed through the reactor tube at a temperature of 610° C. The contact time of the gases in the reaction zone was 7 seconds. The percent yields of the nitriles obtained were as follows: pentenenitriles 37%, acrylonitrile 5%, acetonitrile 5%, and benzonitrile 8%.

Example 5

Using apparatus and procedure analogous to that of Example 1, ethylene (5.17 moles) and cyanogen chloride (3.26 moles) were passed through the pyrex reactor tube maintained at a temperature of 660° C. The contact time of the gases in the reaction zone was 16 seconds. The percent yields of the nitriles obtained were as follows: acetonitrile 6%, acrylonitrile 1%, $\beta$-chloropropionitrile 6%, and maleonitrile 4%.

Example 6

Using apparatus and procedure analogous to that of Example 1, 5.56 moles of ethylene and 2.96 moles of cyanogen chloride were passed through the reactor tube at a temperature of 640° C. for a contact time of 9 seconds. The percent yields of the nitriles were as follows: acetonitrile 3%, acrylonitrile 1%, $\beta$-chloropropionitrile 4%, and maleonitrile 2%.

Example 7

Apparatus and procedure analogous to that of Example 1 was used with the exception that one Dry-Ice trap was employed which followed the alkali bubbler in the receiver train. 6.07 moles of pentene and 2.96 moles of cyanogen chloride were passed through the Pyrex reactor tube maintained at a temperature of 555° C.

The contact time of the gases in the reaction zone was 8 seconds. Based on the initial input of cyanogen chloride, a 32% yield of hexenenitriles was obtained.

*Example 8*

Using apparatus and procedure analogous to that of Example 7, cyclohexene (5.63 moles) and cyanogen chloride (2.68 moles) were passed through the reactor tube at a temperature of 580° C. for a contact time of 10 seconds. The receiver flask was maintained at a temperature of 50° C. Based on the initial input of cyanogen chloride, a 29% yield of a mixture of the isomers of cyanocyclohexene was obtained.

*Example 9*

Using apparatus and procedure analogous to that of Example 8, diisobutylene (5.06 moles) and cyanogen chloride (2.11 moles) were passed through the Pyrex reactor tube maintained at a temperature of 505° C. The contact time of the gases in the reaction zone was about 10 seconds. Based on the initial input of cyanogen chloride, a 12% yield of a mixture of the isomers of cyanodiisobutylene was obtained.

Several modifications of the apparatus and procedure employed in the above examples will be apparent to one skilled in the art. For instance, the reactor may be a tube of Pyrex, quartz or metal alloy providing that it is resistant to the relatively high temperatures of the reaction.

The unsaturated nitriles prepared in accordance with the present invention are useful as intermediates in the preparation of polymers, for example guanamine resins, and unsaturated acids.

While the invention has been described with particular reference to specific embodiments, it is to be understood that it is not to be limited thereto but is to be construed broadly and restricted solely by the scope of the appended claims.

I claim:

1. The method of preparing an unsaturated nitrile which comprises heating an olefin in the presence of cyanogen chloride at a temperature of at least about 450° C., and recovering the thus-formed unsaturated nitrile.

2. The method of claim 1 in which the olefin is present in a molar excess.

3. The method of claim 1 in which the temperature is within the range of from 500° to 675° C.

4. The method of preparing an unsaturated nitrile which comprises heating ethylene in the presence of cyanogen chloride at a temperature within the range of from 450° to 750° C.

5. The method of preparing an unsaturated nitrile which comprises heating propylene in the presence of cyanogen chloride at a temperature within the range of from 450° to 750° C.

6. The method of preparing an unsaturated nitrile which comprises heating 1-butene in the presence of cyanogen chloride at a temperature within the range of from 450° to 750° C.

7. The method of preparing an unsaturated nitrile which comprises heating cyclohexene in the presence of cyanogen chloride at a temperature within the range of from 450° to 750° C.

8. The method of preparing an unsaturated nitrile which comprises heating diisobutylene in the presence of cyanogen chloride at a temperature within the range of from 450° to 750° C.

References Cited in the file of this patent

UNITED STATES PATENTS

| | | |
|---|---|---|
| 2,419,488 | Dutcher | Apr. 22, 1947 |
| 2,553,404 | Dixon | May 15, 1951 |
| 2,553,405 | Dixon | May 15, 1951 |
| 2,606,917 | Dixon | Aug. 12, 1952 |
| 2,653,963 | Cowen et al. | Sept. 29, 1953 |